A. E. GREEN.
POTATO DIGGER.
APPLICATION FILED APR. 20, 1918.
1,276,903.
Patented Aug. 27, 1918.
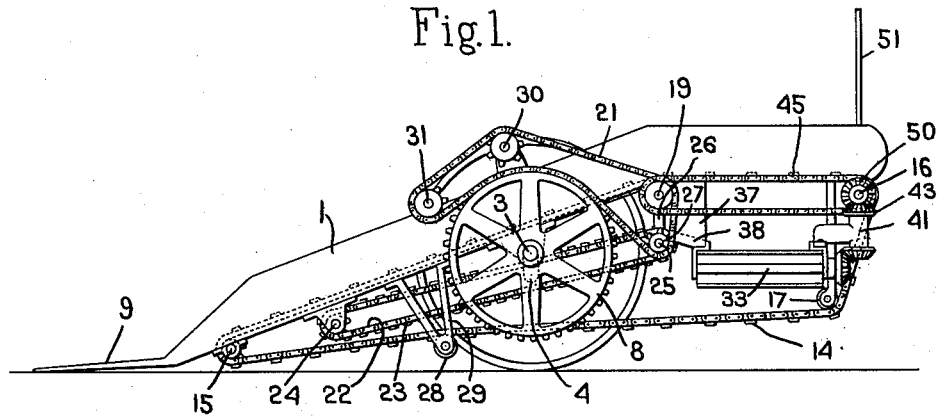
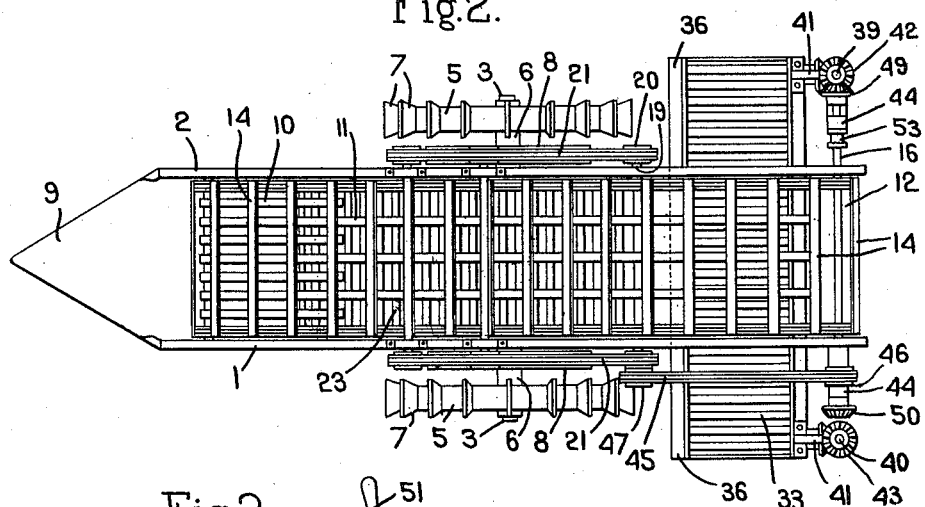
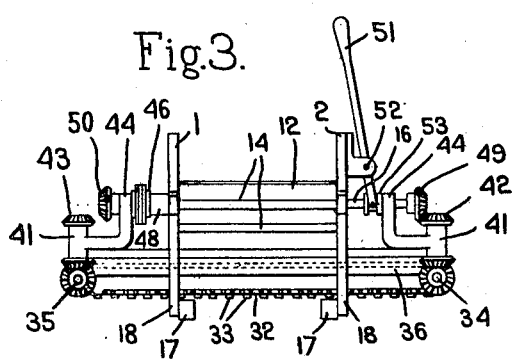
Inventor.
Austin E. Green
by Heard Smith & Tennant
Attys.

UNITED STATES PATENT OFFICE.

AUSTIN E. GREEN, OF EASTON, MAINE.

POTATO-DIGGER.

1,276,903.   Specification of Letters Patent.   Patented Aug. 27, 1918.

Application filed April 20, 1918. Serial No. 229,680.

*To all whom it may concern:*

Be it known that I, AUSTIN E. GREEN, a subject of the King of Great Britain, residing at Easton, county of Aroostook, State of Maine, have invented an Improvement in Potato-Diggers, of which the following description, in connection with the accompanying drawing, is a specification, like characters on the drawing representing like parts.

This invention relates to machines for harvesting or digging potatoes and separating the potatoes from the material dug therewith including the vines, earth, and stones of size differing from the potatoes. The machine may preferably be of a type well known and familiar to those skilled in this art.

The invention has for its object to provide for the separation of the potatoes from the other material during the travel of the potatoes up an upwardly inclined riddle leading from the usual shovel or plow.

The invention has for its further object to provide for the discharge of the separated potatoes not only at the side of the machine but at either side as may be desired by the operator.

The invention has for its further object to provide means such as an auxiliary conveyer beneath the upper portion of the inclined riddle to receive the separated potatoes from the riddle and carry them beneath the riddle to suitable means such as a transverse conveyer which will discharge them at the side of the machine.

The invention has for its further object to provide an improved, simple, strong and efficient machine which will readily separate the potatoes from the other material and discharge them at the required point.

These and other objects of the invention will appear more fully from the accompanying description and drawings and will be particularly pointed out in the claims.

The drawings illustrate so much of a familiar type of potato digger embodying a preferred form of the present invention as is necessary to a disclosure of the invention.

In the drawings,

Figure 1 is a side elevation of the potato digger embodying a preferred form of the invention;

Fig. 2 is a top plan view of the construction shown in Fig. 1;

Fig. 3 is a rear end elevation of the construction shown in Figs. 1 and 2.

As the type of potato digger herein selected for a disclosure of this invention is well known to those skilled in the art it is not necessary to illustrate and describe those parts which are not particularly concerned with the present invention.

A machine of this character may be drawn through the potato field by horses or by a tractor and suitable connections to the frame of the machine are made for that purpose. The elevating and separating elements of the machine may be driven from the wheels by which the machine is supported or by an engine or motor mounted on the machine. For simplicity of disclosure the power is herein shown as taken from the supporting wheels of the machine. But it is obvious that in none of these respects is the invention to be limited to the construction herein illustrated and described.

The machine herein illustrated for convenience in disclosing a preferred form of the present invention comprises a frame including the rearwardly and upwardly inclined main sides 1 and 2. These sides are connected by suitable shafts and braces and preferably by a main fixed axle 3 which in the form illustrated is preferably bent downwardly or depressed at its central section between the main sides at 4. The supporting wheels 5 have their hubs 6 journaled on the ends of this main axle 3 and these wheels are provided with the usual spurs 7.

When as in the form herein illustrated the elements of the machine are driven from the supporting wheels each hub 6 carries a large sprocket wheel 8 driven by a familiar type of ratchet connection from its corresponding supporting wheel 5 in such a manner that when both supporting wheels are moving forward at the same speed both sprocket wheels transmit power and when one supporting wheel moves faster than the other that one which is moving the faster alone transmits the power.

At its lower end the frame of the machine terminates in a suitable shovel or plow member 9. The whole machine is drawn forward in a familiar manner by horse power or by tractor and by suitable connections, not shown, to the frame, and as it is drawn forward the plow or shovel entering the ground plows up the potatoes together with the vines and the associated mass of dirt and stones.

The space between the main sides 1 and 2 in the rear of the shovel is substantially unobstructed except by the connecting braces and shafts and by the parts to be described so that throughout the length of the machine the dirt and finer portions of material plowed up may fall through to the ground beneath.

In the construction herein illustrated the main sides carry at the bottom extending from the shovel to the rear of the machine a rearwardly and upwardly inclined riddle comprising a plurality of longitudinally extending laterally separated bars 10 and 11 and these bars may be fixed or may be agitated as desired. The bars 10 extend only through the lower portion of the riddle and together with the bars 11 present such a spacing that potatoes of a size to be preserved cannot pass therebetween but the dirt and smaller stones may pass therebetween and fall upon the ground.

The bars 11 continue through the upper or remaining portion of the riddle and preferably to the rear of the machine onto a rearwardly discharging chute or casing 12. The spacing between the bars 11 in the upper or rearward portion of the riddle is such that the potatoes to be preserved may pass between the bars and drop from the riddle.

The mass of material dug by the plow or shovel is carried up over the riddle by an endless flexible elevator having its upper run extending above and close to the riddle. This elevator is shown as formed of a pair of endless sprocket chains 13 connected by bars or slats 14. It extends around sprocket wheels carried by a shaft 15 journaled in the main sides directly behind the plow or shovel 9, around sprocket wheels carried by a shaft 16 journaled in the main sides at the rear of the machine and around idlers 17 journaled on brackets 18 depending from the rear of the main sides. At a suitable point intermediate of its length this endless elevator also engages with sprocket wheels connected to the main elevator shaft 19 journaled in the main sides at the rear of the supporting wheels. This main shaft is provided at its outer ends with sprocket wheels 20 engaging sprocket chains 21 by which it is driven from the large sprocket wheels 8.

Means are provided for receiving and conveying rearwardly the separated potatoes dropping or falling through the upper portion of the riddle or that portion beyond the termination of the bars 10. This means preferably consists of an endless flexible auxiliary conveyer having its upper run extending beneath the upper portion of the riddle and acting to receive and convey rearwardly the potatoes dropping through the riddle. This auxiliary conveyer is likewise shown as consisting of a pair of endless sprocket chains 22 united by transversely extending slats 23, these slats being spaced sufficiently close together to prevent the potatoes to be preserved from dropping through but to allow the finer portions of dirt and the smaller stones to pass through to the ground beneath. This auxiliary conveyer extends around a pair of sprocket wheels carried by the shaft 24 journaled in the main sides beneath the upper end of the bars 10 and around a pair of sprocket wheels carried by the shaft 25 preferably journaled in a bracket 26 depending from the main sides beneath the shaft 19 and is preferably driven by the sprocket chains 21 passing around sprocket wheels 27 on the ends of the shaft 25. The depressed portion 4 of the main axle preferably passes between the runs of this conveyer and is shown as depressed for that reason.

The lower runs of these endless conveyers may be kept from sagging as is shown in connection with the main endless elevator by suitable idlers 28 supported on brackets 29 extending downwardly from the main sides.

The sprocket chains 21 which are shown as suitable means for simultaneously driving the two conveyers may be driven from the main sprockets 8 in any suitable manner and are herein shown as contacting with the upper portions of the periphery of the main sprockets 8 and guided by idler sprockets carried by the shafts 30 and 31 extending above and between the main sides.

It will thus be seen that as the mass of dug material moves up the shovel or plow it is caught by the slats or bars 14 of the endless flexible elevator and carried over the riddle. The finer materials pass between the bars of the lower portion of the riddle and after the material passes the ends of the bars 10 in its travel up the riddle the potatoes and necessarily any stones of corresponding size fall between the bars 11 of the riddle and are received and caught by the upper run of the auxiliary conveyer directly therebeneath. The coarser materials including the vines and larger stones pass on up over the bars 11 carried by the elevator and are discharged at the rear of the machine. The finer materials are continually shaken out during the travel of the material up the riddle and drop through to the ground beneath. Any additional potatoes which drop through are caught and received by the auxiliary conveyer.

A further feature of the invention resides in the means for securing the discharge of the potatoes at either side of the machine as may be required so that the machine may be driven back and forth over adjacent rows and the potatoes deposited between the dug furrows.

A simple and preferred means for securing this result will now be described but it will be understood that the construction herein illustrated is but illustrative of the invention.

In the form of construction illustrated an endless conveyer is provided extending transversely of the machine at the rear beneath the upper end of the riddle and the upper end of the endless elevator and in such a position as to receive the potatoes discharged from the auxiliary conveyer. This transverse conveyer is so constructed and operated that it may as desired be driven in either direction so as to discharge the potatoes received by it at either side of the machine as desired.

This transverse conveyer is likewise shown as consisting of a pair of sprocket chains 32 connected by bars or slats 33 so spaced as to prevent the selected potatoes from falling through and to allow the finer materials to pass through to the ground beneath. The sprocket chains comprising this conveyer run over sprocket wheels carried by shafts 34 and 35 mounted on a frame 36 supported beneath from and transversely of the main sides at the rear portion thereof and at the rear and beneath the end of the auxiliary conveyer by suitable depending brackets 18 and 37. An inclined chute 38 supported by the brackets 37 directs the potatoes received and carried by the auxiliary conveyer from the rear end thereof onto the upper run of the transverse conveyer.

The means shown for driving the transverse conveyer comprises vertical shafts 39 and 40 journaled in brackets 41 supported from the frame 36 and provided at their lower ends with beveled pinions intermeshing with corresponding beveled pinions carried on the rear ends of the shafts 34 and 35 respectively. At their upper ends these shafts 39 and 40 carry beveled pinions 42 and 43 respectively. The transverse shaft 16 is slidingly mounted in bearings formed in upturned portions 44 of the brackets 41 and is driven by a sprocket chain 45 running over a sprocket wheel 46 thereon and another sprocket wheel 47 on one end of the main shaft 19. The sprocket wheel 46 is splined to the shaft 16 and held from transverse movement between the bracket portion 44 and a hub 48. This shaft 16 caries at its ends beveled pinions 49 and 50 and by shifting the shaft 16 endwise these pinions coöperate respectively with and drive the pinion 42 and 43. Such a shifting movement may be given by the hand lever 51 fulcrumed on the main side 2 at 52 and engaging a grooved collar 53 on the shaft. It will thus be seen that as the hand lever 51 is shifted in one direction or the other the transverse conveyer will be driven in one direction or the other as required to deliver the potatoes at the required side of the machine, while if the hand lever be placed in the central position neither of the pinions 49 or 50 will coöperate with its corresponding pinion and the conveyer will be driven in either direction.

It will be observed that as the shaft 16 is positively driven by the sprocket chain 45 it will by reason of the engagement of the sprocket wheels thereon already referred to with the sprocket chains 13 of the endless conveyer positively drive the extreme rear portion of the upper run of the endless conveyer which is desirable in view of the fact that the main shaft 19 in the form shown is located at some distance from the extreme rear end of the upper run of this endless elevator.

Having fully described my invention, what I claim as new and desire to secure by Letters Patent is:

1. A potato digger comprising a frame, an upwardly inclined riddle carried in said frame having its bars spaced at the lower portion to prevent, and at the upper portion to permit, potatoes to fall therethrough, an endless flexible elevator having its upper run extending above said riddle and acting to carry the potatoes and other dug material over the riddle, allowing the potatoes to drop through said upper portion and discharging the unriddled material at the rear, and an endless flexible auxiliary conveyer having its upper run extending beneath the said upper portion of the riddle and acting to receive and convey rearwardly the potatoes dropping through the riddle.

2. A potato digger comprising the features defined by claim 1 together with means acting to receive the potatoes from the auxiliary conveyer and discharge them from the machine.

3. A potato digger comprising the features defined by claim 1 together with means acting to receive the potatoes from the auxiliary conveyer and discharge them at either side of the machine as desired.

4. A potato digger comprising the features defined by claim 1 together with a transverse conveyer mounted at the rear of the frame acting to receive the potatoes from the auxiliary conveyer, and means acting to cause the transverse conveyer to discharge the potatoes at either side of the machine as desired.

5. A potato digger comprising an upwardly inclined riddle having its bars spaced at the lower portion to prevent, and at the upper portion to permit, potatoes to fall therethrough, and an endless flexible elevator having its upper run extending above said riddle and acting to carry the potatoes and other dug material over the riddle, allowing the potatoes to drop through said upper portion and discharging the unriddled material at the rear, and means to receive the potatoes dropping through the riddle and convey them rearwardly and laterally and discharge them at the side of the machine.

6. A potato digger comprising an upwardly inclined riddle having its bars spaced at the lower portion to prevent, and at the upper portion to permit, potatoes to fall therethrough, and an endless flexible elevator having its upper run extending above said riddle and acting to carry the potatoes and other dug material over the riddle, allowing the potatoes to drop through said upper portion and discharging the unriddled material at the rear, and means to receive the potatoes dropping through the riddle and convey them rearwardly and laterally and discharge them at either side of the machine as desired.

7. A potato digger comprising means for elevating the potatoes and other dug material, means for separating the potatoes from said material, and means acting to receive the separated potatoes and to convey and discharge them at either side of the machine as required.

8. A potato digger comprising means for elevating the potatoes and other material, means for separating the potatoes from said material, a conveyer located at the rear of the digger and extending transversely thereof and acting to receive the separated potatoes, and means for driving the conveyer in either direction as desired to discharge the potatoes at either side of the machine as desired.

In testimony whereof, I have signed my name to this specification.

AUSTIN E. GREEN.